(No Model.)

A. HASBROUCK.
DRIVING GEAR FOR LOCOMOTIVES.

No. 402,322. Patented Apr. 30, 1889.

Witnesses
A. S. Nye Jr.
Theron D. Davis.

Inventor
Alfred Hasbrouck

UNITED STATES PATENT OFFICE.

ALFRED HASBROUCK, OF ITHACA, NEW YORK.

DRIVING-GEAR FOR LOCOMOTIVES.

SPECIFICATION forming part of Letters Patent No. 402,322, dated April 30, 1889.

Application filed June 21, 1888. Serial No. 277,844. (No model.)

*To all whom it may concern:*

Be it known that I, ALFRED HASBROUCK, a citizen of the United States, residing at Ithaca, in the county of Tompkins and State of New York, have invented certain new and useful Improvements in Driving-Gear for Locomotives; and I hereby declare that the following is a full, clear, and exact description of the invention, such as will enable others skilled in the art to which it appertains to make and use the same.

This invention relates, in general, to that class of locomotives which are designed to run on public highways or at large without guide-rails, and more particularly to that part of the mechanism of locomotives whereby power is communicated from the engine to the draft-wheels, such mechanism being herein termed the "driving-gear."

The object of the invention is, first, to provide a draft-wheel with a rotary bearing upon the engine-truck, whereby the wheel may be turned from side to side in the truck to guide its course of travel independent of its drawing-shaft; second, to provide a self-adapting connection with the shaft, whereby the wheel may be propelled in any of its positions by the said engine; third, to provide means whereby the engineer may instantly disconnect the drive-wheel from the engine or change the rate of speed of the drive-wheel without stopping the engine or changing its speed.

To this end my invention consists in the construction and combination of parts forming drive-gear for locomotives, hereinafter described and claimed, reference being had to the accompanying drawings, in which—

Figure 1:
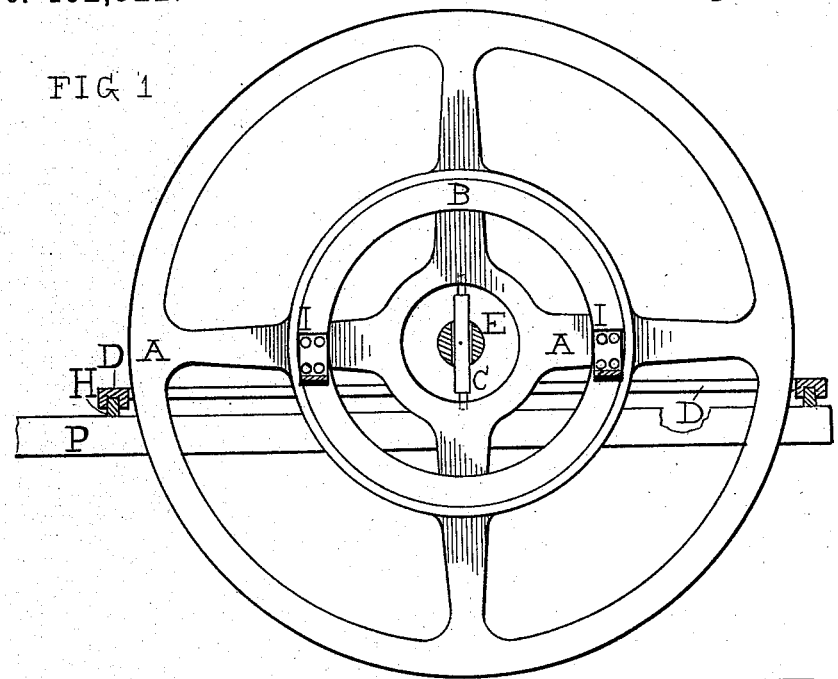
Figure 2:
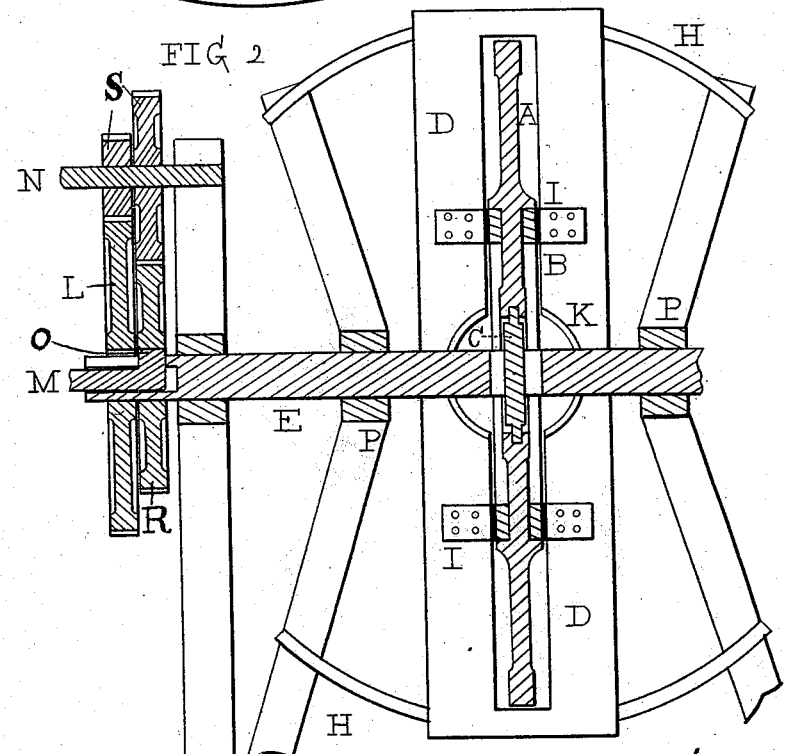

Figure 1 is a side elevation, partly in vertical section, of a drive-wheel, showing my invention; and Fig. 2 shows a horizontal section of the same, partly in plan.

A represents the draft-wheel, journaled to revolve upon and between two annular bearings, B. These bearings are provided with angle-plates 1, by which they are firmly secured to the turn-plate D. The turn-plate is mounted to rotate upon circular horizontal trucks H, which are fixed to some portion of the truck or frame—such as the string-pieces P—and any suitable connection may be made with this turn-plate whereby it and the wheel A, journaled in it, may be turned from side to side for steering the locomotive.

E represents the shaft of the draft-wheel A, journaled in fixed bearings upon the frame P. C is a flat pin inserted through a slot in the shaft E, radial to the wheel and journaled at its ends in bearings in the wheel. By this means the rotation of the shaft communicates rotary motion through the pin to the wheel, even though the wheel be turned from side to side away from a plane at right angles to the shaft.

M is a rod fitted to slide within the shaft, and having a key, O, projecting from one side through a slot in the shaft.

L and R represent gear-wheels of different sizes, fitted to revolve freely upon the shaft E and internally slotted to receive the key O, which, by suitable connections with the rod M, may be moved longitudinally of the shaft to engage either of the said wheels L and R or to disengage both.

N represents an intermediate shaft, which may receive rotary motion from the engine in any suitable manner; and S represents two gear-wheels rigidly fixed upon the shaft N, to rotate therewith, and geared, respectively, with the wheels L and R, whereby different rates of speed may be communicated to the drive-wheel while the engine continues running at an even rate.

Thus the first object of my invention is accomplished by means of the annular bearing B at a distance and wholly disconnected from the shaft E and the rotary plate D; the second by means of the pin C, journaled in the wheel and free to rock endwise in the slot of the shaft, and the third by means of the slide-rod M, having the key O, and the gear-wheels to be connected thereby with the shaft. The engine and boiler may be mounted on the rear portion of the frame P at such distance from the draft-wheel A as will leave only the desired portion of weight on the latter, thus leaving it free to be easily guided. By shifting the key O the speed may be increased or decreased at will, as it is evident there may be more gear-wheels like those shown having greater range of speed, or by the same means the draft-wheel may be suddenly stopped without the danger to the machinery which would result from suddenly stopping the engine, thus avoiding collisions on the road.

Having thus fully described my invention, what I believe to be new, and desire to secure by Letters Patent, is the following:

1. The combination, in a locomotive, of the turn-plate D, the two annular bearings B, fixed thereon, and the draft-wheel A, journaled between and upon the said annular bearings, substantially as shown and described.

2. The combination of the frame P, the circular trucks H, fixed thereon, the turn-plate D, fitted to rotate on the said trucks, the annular bearings B, fixed to the said plate, and the draft-wheel A, journaled between and upon the said annular bearings, substantially as shown and described.

3. The combination of the shaft E, having a slot transversely through it, the wheel A, having a large central opening, and the pin C, having a square body, fitted through the said slot and journaled at its ends in the wheel at the sides of the said opening, substantially as shown and described.

4. The combination of the drive-shaft E, bored in at its end and slotted in its side to meet the bore, the rod M, fitting the said bore and provided with a side key, O, projecting through the said slot, gear-wheels of different sizes journaled upon the said shaft and slotted to register with the said key, and the intermediate shaft, N, having gear-wheels fixed upon it, adapted to gear permanently with the gear-wheels on the drive-shaft, substantially as shown and described.

ALFRED HASBROUCK.

Witnesses:
A. S. NYE, Jr.,
THERON D. DAVIS.